United States Patent
Morino

(10) Patent No.: US 7,280,800 B2
(45) Date of Patent: Oct. 9, 2007

(54) WIRELESS COMMUNICATION DEVICE, WIRELESS COMMUNICATION SYSTEM, WIRELESS COMMUNICATION METHOD AND VEHICLE

(75) Inventor: Hiroaki Morino, Tokyo (JP)

(73) Assignees: Toyota Jidosha Kabushiki Kaisha, Toyota (JP); Toyota Infotechnology Center Co., Ltd., Tokyo (JP)

(*) Notice: Subject to any disclaimer, the term of this patent is extended or adjusted under 35 U.S.C. 154(b) by 600 days.

(21) Appl. No.: 10/508,087

(22) PCT Filed: Mar. 6, 2003

(86) PCT No.: PCT/JP03/02666

§ 371 (c)(1),
(2), (4) Date: Sep. 16, 2004

(87) PCT Pub. No.: WO03/081846

PCT Pub. Date: Oct. 2, 2003

(65) Prior Publication Data

US 2005/0181724 A1   Aug. 18, 2005

(30) Foreign Application Priority Data

Mar. 26, 2002   (JP)   ............... 2002-085714

(51) Int. Cl.
*H04B 7/14* (2006.01)
(52) U.S. Cl. .................. 455/15; 370/328; 370/501; 370/338; 370/430; 455/452.2; 455/436; 455/553.1
(58) Field of Classification Search ............... 320/338, 320/308, 501, 430; 455/15, 452.2, 436, 553.1
See application file for complete search history.

(56) References Cited

U.S. PATENT DOCUMENTS

| | | | | |
|---|---|---|---|---|
| 6,335,939 | B1* | 1/2002 | Hanna et al. | 370/501 |
| 6,526,034 | B1* | 2/2003 | Gorsuch | 370/338 |
| 6,708,031 | B2* | 3/2004 | Purnadi et al. | 455/436 |
| 6,801,777 | B2* | 10/2004 | Rusch | 455/452.2 |
| 6,917,624 | B1* | 7/2005 | Gorman | 370/430 |
| 7,013,162 | B2* | 3/2006 | Gorsuch | 455/553.1 |
| 2002/0025835 | A1 | 2/2002 | Izumi | |
| 2003/0152058 | A1* | 8/2003 | Cimini et al. | 370/338 |

FOREIGN PATENT DOCUMENTS

| | | |
|---|---|---|
| EP | 1 113 592 A2 | 7/2001 |
| JP | A 11-509992 | 8/1999 |
| JP | A 2000-502544 | 2/2000 |
| JP | A 2001-36970 | 2/2001 |
| JP | A 2001-156787 | 6/2001 |
| JP | A 2001-285345 | 10/2001 |

* cited by examiner

*Primary Examiner*—Joseph Feild
*Assistant Examiner*—David Q. Nguyen
(74) *Attorney, Agent, or Firm*—Oliff & Berridge, PLC

(57) ABSTRACT

A wireless communication device for performing wireless communications between a plurality of terminals embraced by a multi-hop wireless communication network, includes first communication means for transmitting and receiving neighboring terminal information at a first speed to and from non-neighboring terminals other than neighboring terminals of a self-terminal, and second communication means for transmitting and receiving information other than at least the neighboring terminal information at a second speed higher than the first speed to and from the neighboring terminals to the self-terminal.

23 Claims, 6 Drawing Sheets

FIG. 1
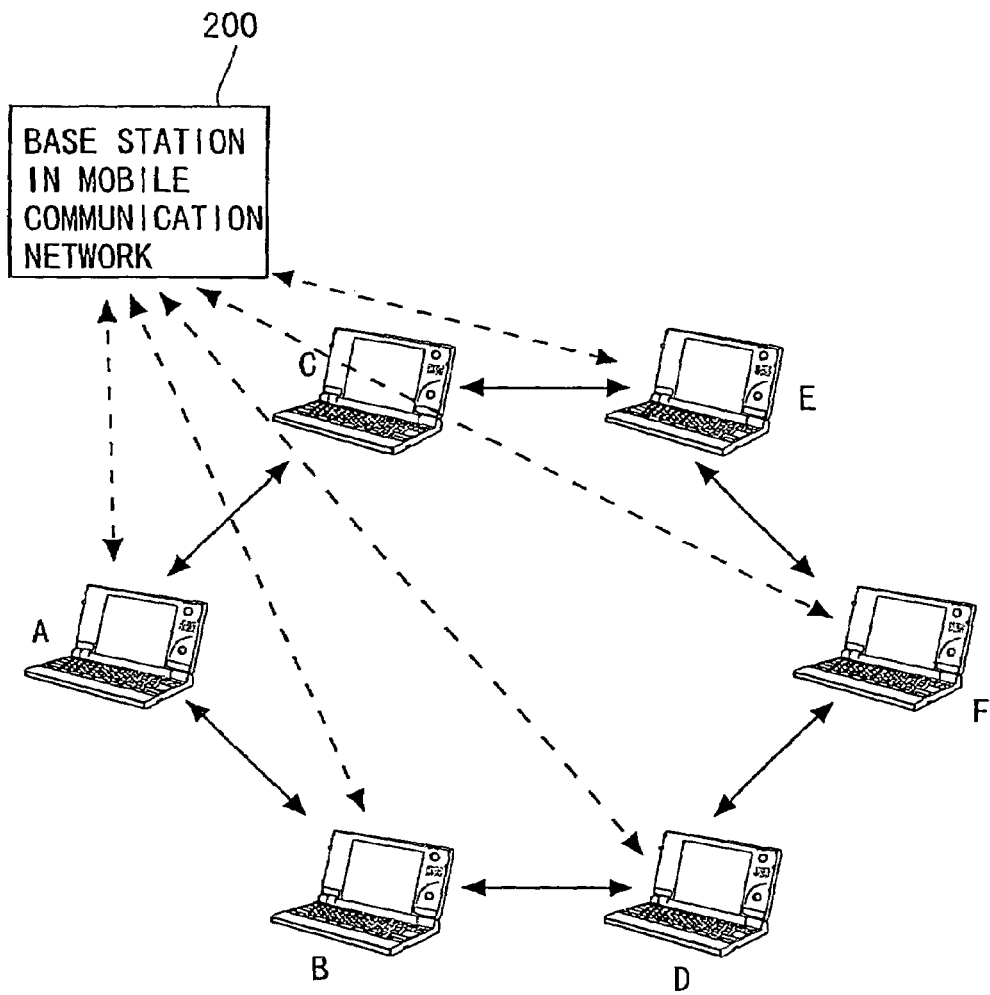
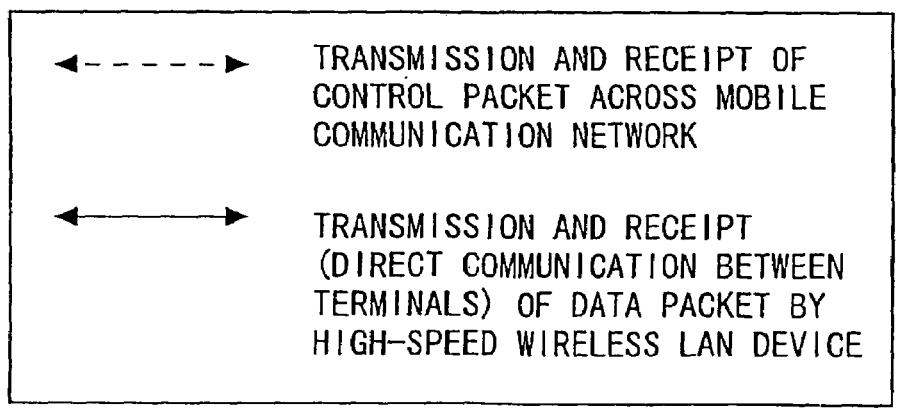

WIRELESS COMMUNICATION DEVICE, WIRELESS COMMUNICATION SYSTEM, WIRELESS COMMUNICATION METHOD AND VEHICLE

TECHNICAL FIELD

The present invention relates to a wireless communication device for performing wireless communications between a plurality of terminals embraced by a multi-hop wireless communication network, a wireless communication system, a wireless communication method and a vehicle mounted with the wireless communication device.

BACKGROUND ARTS

A known conventional terminal-to-terminal communication system is that communications are performed by relaying some terminals among the terminals far beyond a radio wave reachable range as well as between terminals within a radio wave reachable range across a multi-hop wireless communication network. In an environment where a route between the terminals in the multi-hop wireless communication network changes (switchover) at a high frequency, a link state routing system is exemplified as a route recognizing system suited to a case of performing the communications with a high throughput between two pieces of specified terminals.

In a multi-hop wireless communication network system, there is proposed a system (Guangyu Pei et al, "Fisheye State Routing: A Routing Scheme for Ad Hoc Wireless Networks", ICC2000) in which the principle of the link state routing system (J. Moy, "OSPF Version 2", RFC1247 July 1991.) employed for a wired network is applied to a wireless network substantially as it is. An evaluation about the wireless communication system is conducted based on the assumption mainly of 2.4 GHz band 2 Mbps IEEE802.11b Wireless LAN (Local Area Network).

At the present time, however, it is general to perform high-throughput packet communications utilizing a wireless LAN exhibiting a much higher transmission speed on the order of 11 Mbps, and, at a research-and-development stage, a development of a wireless LAN having 54 Mbps at the maximum is underway. The wireless communication system has such a property that a radio wave reachable distance becomes shorter as the transmission speed gets higher, and hence, when the two terminals located at the same distance away from each other try to perform multi-hop communications by utilizing a higher speed wireless communication system, a greater number of relay terminals (hop terminals) than in the evaluation result in the literature are required.

In the conventional system, when the two terminals perform the packet communications by way of the multi-hop wireless communications, a data size of control packets transmitted by the single terminal in order to announce a neighboring terminal list increases in proportion to a total number of the terminals participating in the packet communications (a total number of the transmission terminals, the receipt terminals and the relay terminals). Accordingly, as the number of the relay terminals rises, the control packets give a large overhead to bandwidth of wireless links, resulting in such a problem that the throughput of the data packets is restricted.

DISCLOSURE OF THE INVENTION

It is an object of the present invention to prevent a restriction of a throughput of information (e.g., data packets) other than neighboring terminal information in a multi-hop wireless communication network embracing a plurality of terminals even when there increase both the number of terminals (relay terminals) and neighboring terminal information (e.g., control packets) that should be transmitted to and received from each other.

The present invention is, to accomplish the above object, a wireless communication device for performing wireless communications between a plurality of terminals embraced by a multi-hop wireless communication network, comprising first communication means for transmitting and receiving neighboring terminal information at a first speed to and from non-neighboring terminals other than neighboring terminals of a self-terminal, and second communication means for transmitting and receiving information other than at least the neighboring terminal information at a second speed higher than the first speed to and from the neighboring terminals to the self-terminal.

According to the present invention, in the multi-hop wireless communication network embracing the plurality of terminals, even when there increase both the number of terminals (relay terminals) and neighboring terminal information (e.g., control packets) that should be transmitted to and received from each other, the neighboring terminal information is transmitted to and received from the non-neighboring terminals that are not neighboring to the self-terminal by use of the first communication means, and therefore the throughput of the information (e.g., data packets) excluding the neighboring terminal information is not restricted.

In the wireless communication device described above, for instance, the first communication means receives data (e.g., a neighboring terminal list announcing list which will be explained in an embodiment) containing network addresses of neighboring terminals neighboring to the non-neighboring terminals from the non-neighboring terminals that are not neighboring to the self-terminal, and transmits data (e.g., a neighboring terminal list announcing packet which will be descried in the embodiment) containing network addresses of the neighboring terminals neighboring to the self-terminal to the non-neighboring terminals that are not neighboring to the self-terminal.

In the wireless communication device described above, for example, the second communication means receives the data (e.g., a HELLO packet and a data packet which will be explained in the embodiment) containing the network addresses of the neighboring terminals from the neighboring terminals neighboring to the self-terminal, and transmits the data (e.g., the HELLO packet and the data packet which will be explained in the embodiment) containing a network address of the self-terminal to the neighboring terminals neighboring to the self-terminal.

The wireless communication device described above further comprises, for instance, route constructing means for structuring routes on the multi-hop wireless communication network on the basis of route constructing data containing the network addresses of the neighboring terminals neighboring to the non-neighboring terminal which are received by the first communication means and the network addresses of the neighboring terminals which are received by the second communication means, wherein the second communication means transmits data other than the route constructing data to the neighboring terminals neighboring to the self-terminal along the route structured by the route constructing means.

With this contrivance, as by the conventional wireless communication device, the routes on the multi-hop wireless communication network can be built up.

In the wireless communication device described above, for example, the first communication means transmits and receives the neighboring terminal information to and from the non-neighboring terminals that are not neighboring to the self-terminal via the base station.

With this scheme, a power supply of the base station can be utilized, and hence the terminal can transmit and receive the neighboring terminal information to and received from the terminals located at far distances with comparatively small electric power.

In the wireless communication device described above, for instance, each of the first communication means and the second communication means can be constructed as a single communication device.

The wireless communication device described above further can comprise a single communication device including the first communication means and the second communication means, wherein the communication device performs the communications in a way that switches over the communications by the first communication means and the communications by the second communication means.

The present invention can be specified as follows by way of the invention of a system. A wireless communication system serves to perform wireless communications between a plurality of terminals embraced by a multi-hop wireless communication network, each of the terminals comprising first communication means for transmitting and receiving neighboring terminal information at a first speed to and from non-neighboring terminals other than neighboring terminals neighboring to a self-terminal, and second communication means for transmitting and receiving information other than at least the neighboring terminal information at a second speed higher than the first speed to and from the neighboring terminals neighboring to the self-terminal.

The present invention can be also specified as follows by way of the invention of a method. A wireless communication method serves to perform wireless communications between a plurality of terminals embraced by a multi-hop wireless communication network, wherein each of the terminals transmits and receives neighboring terminal information at a first speed to and from non-neighboring terminals other than neighboring terminals to a self-terminal, and each of the terminals transmits and receives information other than at least the neighboring terminal information at a second speed higher than the first speed to and from the neighboring terminals neighboring to the self-terminal.

The present invention can be also specified as below by way of a vehicle mounted with the wireless communication device. A vehicle is mounted with a wireless communication device for performing wireless communications between a plurality of terminals embraced by a multi-hop wireless communication network, the wireless communication device comprising first communication means for transmitting and receiving neighboring terminal information at a first speed to and from non-neighboring terminals other than neighboring terminals neighboring to a self-terminal, and second, communication means for transmitting and receiving information other than at least the neighboring terminal information at a second speed higher than the first speed to and from the neighboring terminals neighboring to the self-terminal.

The present invention can further be specified as below by way of a wireless communication terminal.

A wireless communication terminal embraced by a multi-hop wireless communication network, comprises first wireless communication means for performing communications with other terminals embraced by the multi-hop wireless communication network with no intermediary of the multi-hop wireless communication network, and second wireless communication means for performing communications with neighboring terminals neighboring to a self-terminal which reside in its own radio wave reachable range among other terminals embraced by the multi-hop wireless communication network, wherein the first wireless communication means transmits and receives information of the neighboring terminals to and from other terminals, and the second wireless communication means transmits and receives information excluding at least the neighboring terminal information to and from the neighboring terminals neighboring to the self-terminal.

According to the present invention, in the multi-hop wireless communication network embracing the plurality of terminals, even when there increase both the number of terminals (relay terminals) and neighboring terminal information (e.g., control packets) that should be transmitted to and received from each other, the neighboring terminal information is transmitted to and received from other terminals by use of the first communication means, and therefore the throughput of the information (e.g., data packets) excluding the neighboring terminal information is not restricted.

In the wireless communication terminal described above, a communication speed of the second wireless communication means is higher than a communication speed of the first wireless communication means. This shows one example of the communication speeds of the first wireless communication means and of the second communication means. Accordingly, the communication speeds of the first wireless communication means and of the second communication means may be set equal to each other and may take other speed relationship.

Further, in the wireless communication terminal described above, for example, the first wireless communication means receives data containing network addresses of other terminals and network addresses of neighboring terminals neighboring to other terminals from other terminals, and transmits data containing a network address of the self-terminal and the network addresses of the neighboring terminals neighboring to the self-terminal to other terminals.

Moreover, in the wireless communication terminal described above, for instance, the second wireless communication means receives data containing network addresses of neighboring terminals neighboring to the self-terminal from the neighboring terminal, and transmits data containing a network address of the self-terminal to the neighboring terminals neighboring to the self-terminal.

Still further, in the wireless communication terminal described above, for example, the information of the neighboring terminals is route constructing data (e.g., part or the whole of the route constructing data) for structuring routes on the multi-hop wireless network.

Yet further, in the wireless communication terminal described above, for example, the route constructing data contain the network addresses of the neighboring terminals neighboring to other terminals, which are received by at least the first wireless communication means.

Moreover, the wireless communication terminal described above further comprises, for instance, route constructing means for structuring routes on the multi-hop wireless communication network on the basis of the route constructing data.

With this contrivance, as by the conventional wireless communication device, the routes on the multi-hop wireless communication network can be built up.

Furthermore, in the wireless communication terminal described above, for example, the second wireless communication means transmits data (e.g., data packets) other than the route constructing data along the routes structured by the route constructing means to the neighboring terminals neighboring to the self-terminal.

Further, in the wireless communication terminal described above, for instance, the first wireless communication means transmits and receives the information of the neighboring terminal to and from other terminals via the base station.

With this scheme, the power supply of the base station can be utilized, and hence the terminal can transmit and receive the neighboring terminal information to and received from the terminals located at far distances with comparatively small electric power.

Furthermore, in the wireless communication terminal described above, for example, the second wireless communication means further transmits and receives the information of the neighboring terminal to and from the neighboring terminals neighboring to the self-terminal.

Moreover, in the aforementioned wireless communication terminal, e.g., each of the first wireless communication means and the second wireless communication means is constructed as a single communication device.

Further, he aforementioned wireless communication terminal further comprises, for instance, a single communication device including the first wireless communication means and the second wireless communication means, wherein the communication device performs the communications in a way that switches over the communications by the first wireless communication means and the communications by the second wireless communication means.

The present invention can also be specified as follows by way of the invention of a system. A wireless communication system is configured by a plurality of terminals embraced by a multi-hop wireless communication network, and each of the terminals comprises first wireless communication means for performing communications with other terminals embraced by the multi-hop wireless communication network with no intermediary of the multi-hop wireless communication network, and second wireless communication means for performing communications with neighboring terminals neighboring to a self-terminal which reside in its own radio wave reachable range among other terminals embraced by the multi-hop wireless communication network, wherein the first wireless communication means transmits and receives information of the neighboring terminals to and from other terminals, and the second wireless communication means transmits and receives information excluding at least the neighboring terminal information to and from the neighboring terminals neighboring to the self-terminal.

The present invention can be also specified as below by way of the invention of a method. A wireless communication method serves to perform wireless communications between a wireless communication terminal embraced by a multi-hop wireless communication network and other terminals, the wireless communication terminal comprising first wireless communication means for performing communications with other terminals embraced by the multi-hop wireless communication network with no intermediary of the multi-hop wireless communication network, and second wireless communication means for performing communications with neighboring terminals neighboring to a self-terminal which reside in its own radio wave reachable range among other terminals embraced by the multi-hop wireless communication network, wherein the wireless communication terminal transmits and receives information of the neighboring terminals to and from other terminals by use of the first wireless communication means, and the wireless communication terminal transmits and receives information excluding at least the neighboring terminal information to and from the neighboring terminals neighboring to the self-terminal by use of the second wireless communication means.

The present invention can be further specified as below by way of a vehicle mounted with the wireless communication terminal. A vehicle is mounted with a wireless communication terminal embraced by a multi-hop wireless communication network, the wireless communication terminal comprising first wireless communication means for performing communications with other terminals embraced by the multi-hop wireless communication network with no intermediary of the multi-hop wireless communication network, and second wireless communication means for performing communications with neighboring terminals neighboring to a self-terminal which reside in its own radio wave reachable range among other terminals embraced by the multi-hop wireless communication network, wherein the first wireless communication means transmits and receives information of the neighboring terminals to and from other terminals, and the second wireless communication means transmits and receives information excluding at least the neighboring terminal information to and from the neighboring terminals neighboring to the self-terminal.

BRIEF DESCRIPTION OF THE DRAWINGS

FIG. 1 is an explanatory view of an outline of a system architecture of a wireless communication system in an embodiment of the present invention;

BEST MODE FOR CARRYING OUT THE INVENTION

Figure 2:
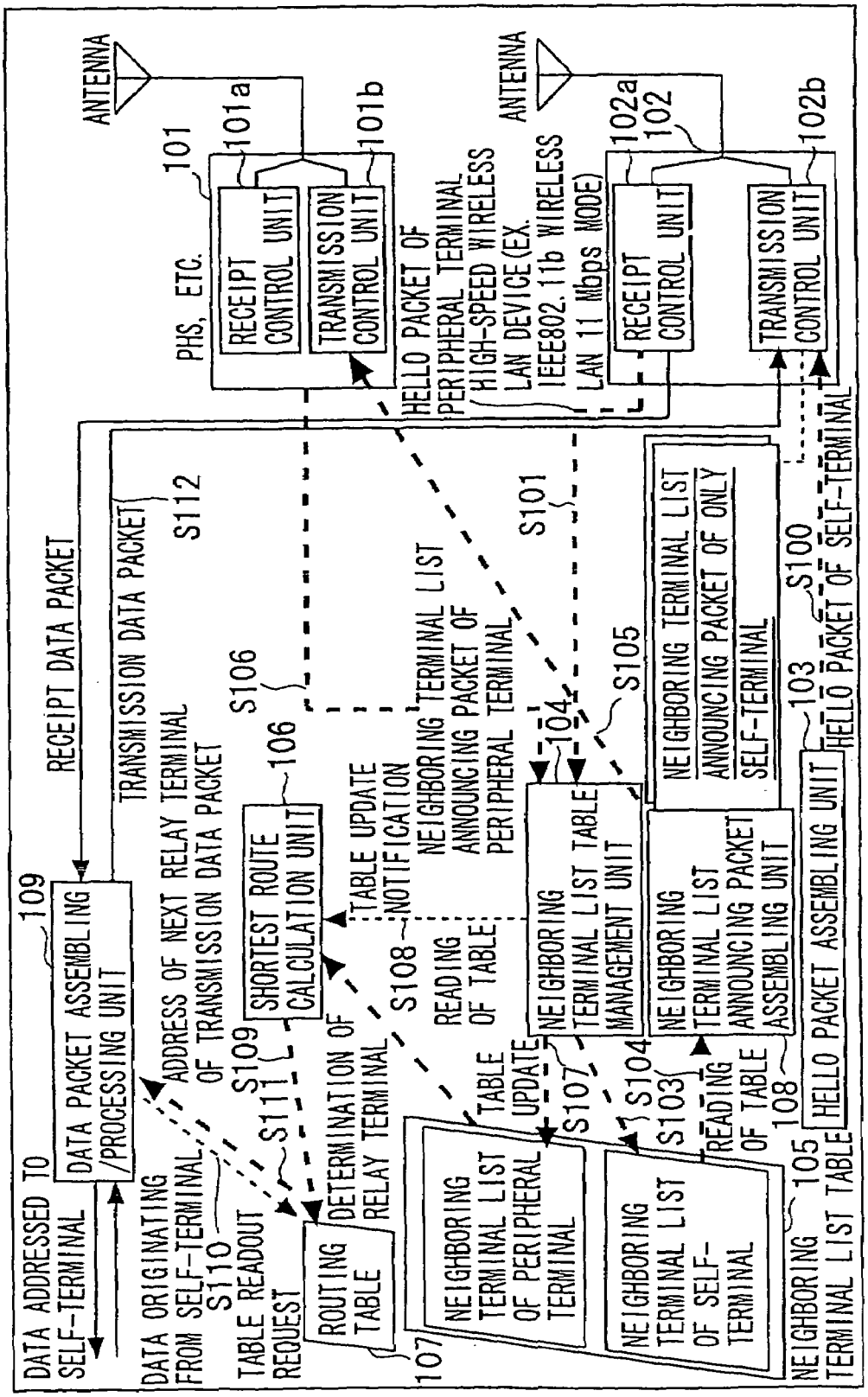
FIG. 2 is an explanatory view showing mainly a hardware architecture of a terminal included in the wireless communication system in the embodiment of the present invention.

A wireless communication system will be explained with reference to the drawings by way of an embodiment of the present invention. FIG. 1 is an explanatory view of an outline of a system architecture of the wireless communication system in the embodiment of the present invention. FIG. 2 is an explanatory view showing mainly a hardware architecture of the wireless communication device (which will hereinafter be called a terminal) included in the wireless communication system in the embodiment of the present invention. The discussion will hereinafter be made by exemplifying a case where the terminal is a mobile information terminal (which may also be simply called a mobile terminal) such as a notebook type personal computer and a PDA (Personal Digital Assistant).

The wireless communication system is a system for performing wireless communications among a plurality of terminals A through F included in a multi-hop wireless communication network.

The terminals A through F are disposed as shown in FIG. 1 and configure the multi-hop wireless communication network. In FIG. 1, two pieces of terminals (e.g., the terminal A and the terminal D) connected to each other via a base station 200 as indicated by two arrowheads of dotted-lines, are shown as a terminal pair incapable of directly communicating with each other by a second communication means 102 but capable of communicating with each other via the base station 200 by a first communication means 101. A distance between the terminals in this case is not particularly limited.

Further, the two terminals (e.g., the terminal A and the terminal B) connected to each other as indicated by two arrowheads of solid lines are defined as a terminal pair capable of directly communicating with each other by the second communication means 102. In this case, a distance between the terminals is on the order of, for instance, 150 m outdoors.

As shown in FIG. 2, the terminal A includes (the terminals B through F likewise include) the first communication means (which may also be called a first wireless communication means) 101, the second communication means (which may also be called a second wireless communication means) 102, a HELLO packet assembling unit 103, a neighboring terminal list table management unit 104, a neighboring terminal list table 105, a shortest route calculation (algorithm) unit 106, a routing table 107, a neighboring terminal list announcing packet assembling unit 108 and a data packet assembling/processing unit 109.

The first communication means 101 is a device for transmitting and receiving pieces of neighboring terminal information at a first speed (e.g., 50 kbps) via the base station 200 between at least non-neighboring terminals other than neighboring terminals to the first communication means 101 itself (which will hereinafter be termed a self-terminal). Namely, the first communication means 101 is capable of performing the communications in such a communication system that a transmission speed is low, while a radio wave reachable distance is long (a first radio wave reachable distance is provided). Note that an expression of "at least" is given above, and therefore the first communication means 101 may perform the communications between terminals (such as other terminals embraced by (residing in) the multi-hop wireless communication network (to be specific, the whole or part of terminals excluding the self-terminal) other than the non-neighboring terminals.

The neighboring terminal information is part (or the whole) of route constructing data for structuring routes on the multi-hop wireless communication network. It should be noted that a terminal communicable with the self-terminal by the first communication means 101 is called a non-neighboring terminal (other than the neighboring terminals to the self-terminal) to the self-terminal. Further, a terminal directly communicable with the self-terminal by the second communication means 101 is called a neighboring terminal to the self-terminal.

The first communication means 101 includes a receipt control unit 101a and a transmission control unit 101b. The receipt control unit 101a receives data containing network addresses (which are addresses, e.g., IP addresses on the multi-hop wireless communication network) of the neighboring terminals neighboring to the non-neighboring terminal from this non-neighboring terminal other than the neighboring terminals to the self-terminal as part (or the whole) of the rout structuring data. For example, the receipt control unit 101a of the terminal A receives the data (packetized data) containing network addresses of the neighboring terminals B and F neighboring to the non-neighboring terminal D from this non-neighboring terminal D or the like other than the neighboring terminals B and C neighboring to the self-terminal A as part (or the whole) of the rout structuring data.

The transmission control unit 101b transmits the data containing network addresses of the neighboring terminals neighboring to the self-terminal to the non-neighboring terminal that is not neighboring to the self-terminal. For instance, the transmission control unit 101b of the terminal A transmits the data (packetized data) containing network addresses of the neighboring terminals B and C neighboring to the self-terminal A to the non-neighboring terminal D, etc. that is not neighboring to the self-terminal A. The first communication means 101 can involve using a communication device such as a PHS (Personal Handyphone System) phone or a cell phone capable of performing the communications (packet communications) via the base station 200. Thus, the communications performed by the first communication means via the base station 200 can utilize a power source of the base station 200, and hence the respective terminals A through F can transmit and receive the neighboring terminal information to and from far distant terminals with comparatively small electric power.

The second communication means 102 is a device for transmitting and receiving at least information other than the neighboring terminal information at a second speed (e.g., 11 Mbps) higher than the first speed between the neighboring terminals to the self-terminal. Namely, the second communication means 102 is the device employing a communication system in the transmission speed is high, while the radio wave reachable distance is short (a second radio wave reachable distance shorter than the first radio wave reachable distance is provided). To be more specific, the second communication means 102 serves to perform communications between terminals (which will hereinafter referred to as neighboring terminals) residing in a self radio wave reachable range among other terminals embraced by the multi-hop wireless communication network. The information other than the neighboring terminal information is part (or the whole) of the route constructing data.

The second communication means 102 includes a receipt control unit 102a and a transmission control unit 102b. The receipt control unit 102a receives data containing network addresses of the neighboring terminals from these neighboring terminals to the self-terminal as data excluding part (or the whole) of the rout structuring data. For example, the receipt control unit 102a of the terminal A receives the data (HELLO packet) containing network addresses of the neighboring terminals B and C from these neighboring terminals B and C neighboring to the self-terminal A as the data other than part (or the whole) of the rout structuring data.

The transmission control unit 102b transmits the data containing a network address of the self-terminal to the neighboring terminals neighboring to the self-terminal. For instance, the transmission control unit 102b of the terminal A transmits the data (HELLO packet) containing the network address of the self-terminal A to the neighboring terminals B and C neighboring to the self-terminal A. The second communication means 1021 can involve using a high-speed wireless LAN device defined by, e.g., IEEE802.11b Wireless LAN 11 Mbps Mode, etc. Note that the second communication means 102 can also involve using the communication device such as the PHS phone or the cell phone.

The HELLO packet assembling unit 103 assembles a packet called a HELLO packet containing the net work address of the self-terminal in order to announce the network address of the self-terminal to peripheral terminals at an interval of a certain fixed period. For example, the HELLO packet assembling unit 103 of the terminal A assembles the HELLO packet containing the network address of the self-terminal A.

The neighboring terminal list table management unit 104 registers, in the neighboring terminal list table 105, the network addresses, received as part (or the whole) of the route constructing data by the first communication means 101, of the neighboring terminals to the non-neighboring terminal that is not neighboring to the self-terminal, and the network addresses, received as the data other than part (or the whole) of the route constructing data by the second communication means 102, of the neighboring terminals to the self-terminal.

Figure 3:
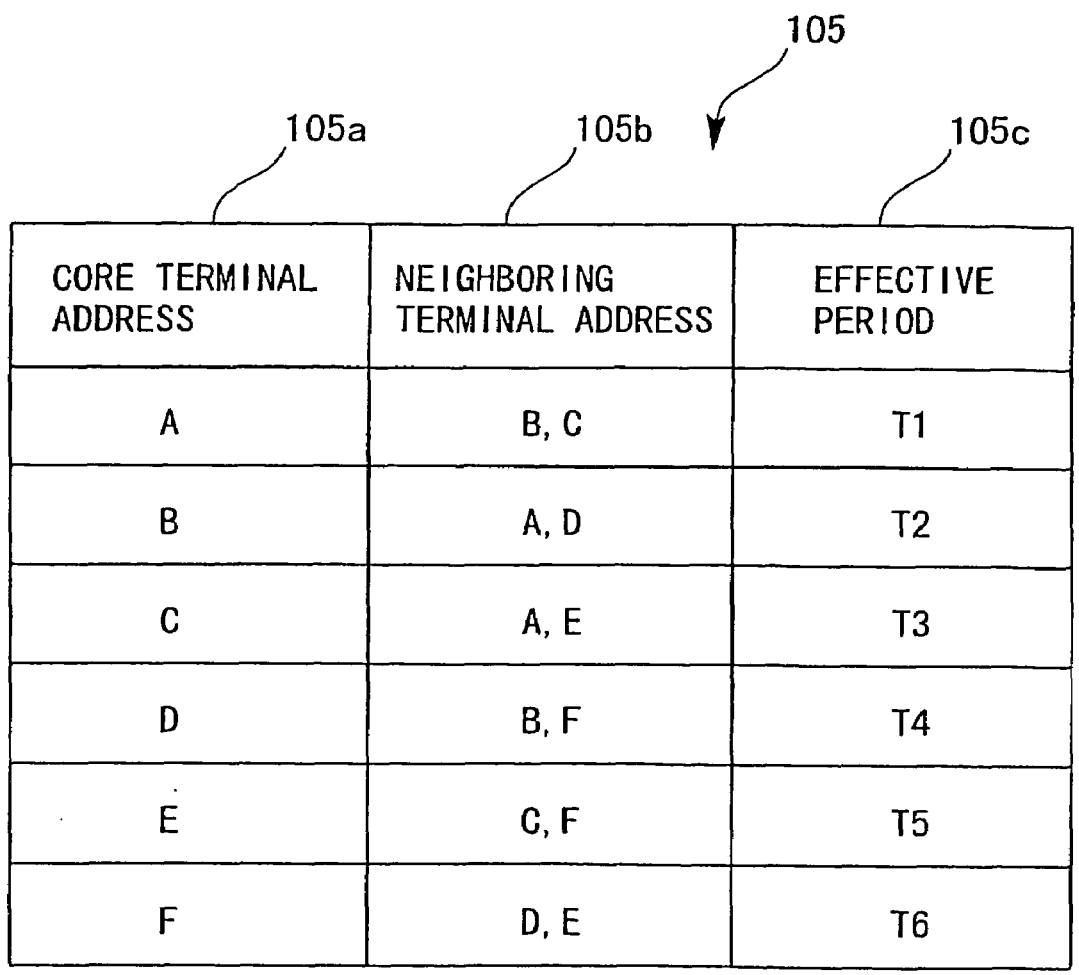
FIG. 3 is an example of a data structure of a neighboring terminal list table retained on a terminal A included in the wireless communication system in the embodiment of the present invention.

The neighboring terminal list table 105 is a table in which the neighboring terminal list table management unit 104 registers the network addresses of the neighboring terminals to other non-neighboring terminal that is not neighboring to the self-terminal and the network addresses of the neighboring terminals to the self-terminal. FIG. 3 shows a data structure of the neighboring terminal list table 105. This neighboring terminal list table 105 is retained on the terminal A.

The neighboring terminal list table 105 is structured including a core terminal address 105a, a neighboring terminal address 105b and an effective period 105c. The core terminal address 105a is registered with the addresses of the terminals A through F including the self-terminal, which are embraced by the multi-hop wireless communication network. The neighboring terminal address 105b is registered with the addresses of the neighboring terminals to the terminals of which the addresses have been registered in the core terminal address 105a. The neighboring terminal address 105b is updated when receiving a neighboring terminal list announcing packet from the neighboring terminal to the self-terminal. The neighboring terminal address 105b is also updated when receiving the address of the-neighboring terminal to the non-neighboring terminal from the non-neighboring terminal that is not neighboring to the self-terminal.

The effective period 105c is registered with time when contents registered in the core terminal address 105a and in the neighboring terminal address 105b are to be deleted. A new effective period is set in the effective period 105c each time the neighboring terminal address 105b is updated. Elements (data) in respective items (fields) of the table are deleted when reaching the effective period set in the effective period 105c (when a fixed period of time elapses since the elements (data) have been updated).

The shortest route calculation unit 106 serves to structure routes to the respective terminals (excluding the self-terminal but embraced by the multi-hop communication network) on the multi-hop wireless communication network on the basis of the data registered in the neighboring terminal list table 105.

Figure 4:
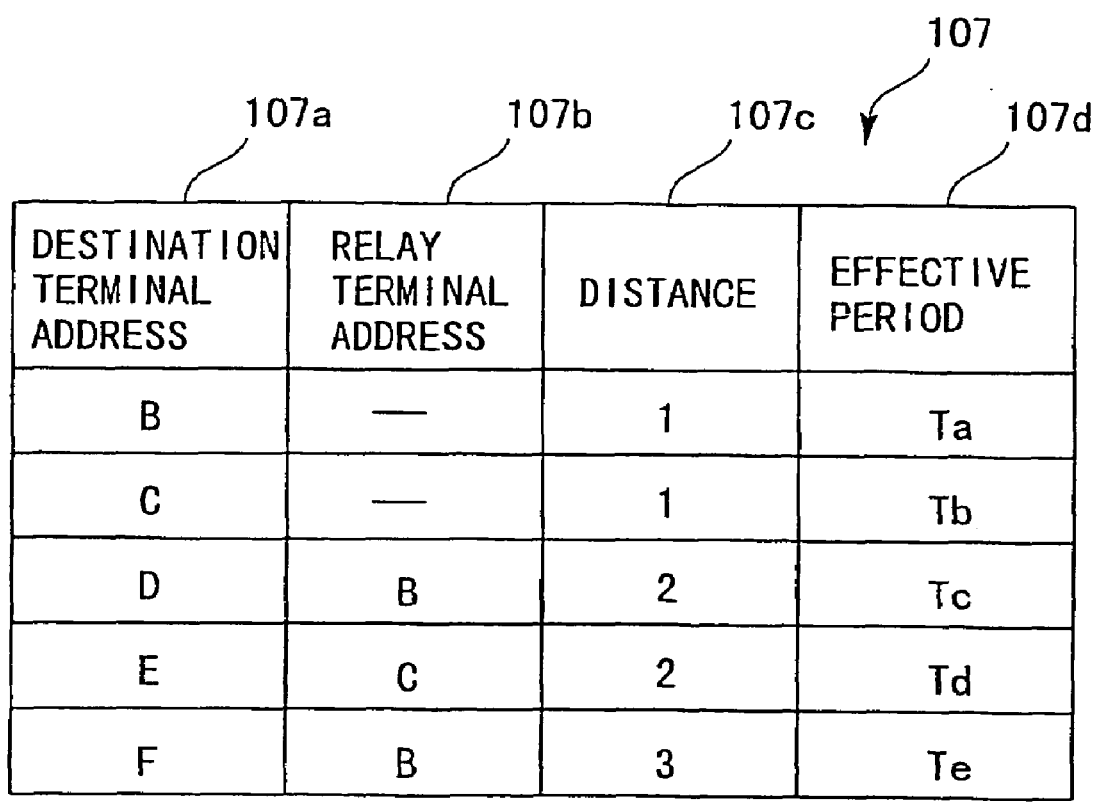
FIG. 4 shows a data structure of a routing table retained on the terminal A included in the wireless communication system in the embodiment of the present invention.

The routing table 107 is a table for registering the routes built up by the shortest route calculation unit 106. FIG. 4 shows a data structure of the routing table 107. This is an example of the routing table 107 retained on the terminal A.

The routing table 107 is structured including a destination terminal address 107a, a relay terminal address 107b, a distance 107c and an effective period 107d.

The destination terminal address 107a is registered with the addresses of the terminals excluding the self-terminal but embraced by the multi-hop wireless communication network. The relay terminal address 107b is registered with an address of a (next-hop) terminal to which the packet from the self-terminal should be transmitted (relayed) next so that the packet reaches a terminal (which will hereinafter be called a destination terminal) registered in the destination terminal address 107a along a route on the multi-hop wireless communication network, i.e., reaches the destination terminal along the shortest route. For instance, when transmitting the packet to the destination terminal F, the self-terminal A can grasp that the packet from the self-terminal A should be transmitted to the terminal B in a way that refers to the routing table 107.

The distance 107c indicates a hop count to reach the destination terminal from the self-terminal.

The effective period 107d is registered with time when the contents registered in the destination terminal address 107a, the relay terminal address 107b and the distance 107c are to be deleted. Elements (data) in respective items (fields) are deleted when reaching the effective period set in the effective period 107c (when a fixed period of time elapses since the elements have been updated).

The neighboring terminal list announcing packet assembling unit 108 reads the neighboring terminal list of the self-terminal from the neighboring terminal list table 105, and assembles the packet in a way that contains (registers) this readout list in a payload of the packet. The data packet assembling/processing unit 109 determines mainly the address of the neighboring terminal to the self-terminal by referring to the routing table 107, and assembles the packet (the data packet, etc.) addressed to the thus-determined address. Further, the data packet assembling/processing unit 109 captures the data packet addressed to the self-terminal among the data packets received from the second communication means 102.

Next, an operation in the wireless communication system having the architecture described above will be explained with reference to FIG. 2. The explanation will be made on the assumption that the first communication means is the PHS phone, and the second communication means is the high-speed wireless LAN device in the following discussion. Note that an operational example of forwarding the data packet to the terminal F from the terminal A will be described, however, the operation between other terminals is the same in the following discussion.

(1) Transmission of HELLO Packet

The HELLO packet assembling unit 103 of the terminal A assembles the HELLO packet containing the network address of the self-terminal A at the interval of a certain fixed period in order to announce the network address of the self-terminal A to the peripheral terminals. The terminal A transmits at the second speed the assembled HELLO packet to the peripheral terminals, i.e., the terminals residing in its own radio wave reachable range (of the second communication means 102) by use of the second communication means 102 (S100). Similarly, each of the terminals B through F assembles the HELLO packet containing the network address of the self-terminal at the interval of a certain fixed period and transmits at the second speed the assembled HELLO packet to the peripheral terminals, i.e., the terminals residing in its own radio wave reachable range (of the second communication means 102).

(2) Receipt of HELLO Packet

The terminal A receives the HELLO packets transmitted at the second speed from the peripheral terminals B through F by use of the second communication means 102 (S101). In the present embodiment, the terminal A receives the HELLO packets (containing the network addresses of the terminal B and C) transmitted individually from the terminals located at comparatively short distances, i.e., the terminals B and C (the neighboring terminals to the self-terminal) residing in its own radio wave reachable range (of the second communication means 102).

The terminal A having received the hello packets from the peripheral terminals B and C extracts the address of the neighboring terminals from the received HELLO packets. Herein, the addresses of the terminals B and C are extracted as the addresses of the neighboring terminals. The terminal A uses the neighboring terminal list table management unit 104 to register the extracted addresses of the neighboring terminals B and C in the neighboring terminal list table 105 in a way that associates these extracted addresses with the address of the self-terminal A (S103). To be specific, the address of the self-terminal A is registered in (the field of) the core terminal address 105$a$, and the extracted network addresses of the terminals B and C are registered in (the field of) the neighboring terminal address 105$b$ (see FIG. 3). Further, the addresses of the terminals B and C are registered in the core terminal address 105$a$, and the address of the self-terminal A is registered in the neighboring terminal address 105$b$.

Similarly, the terminals B through F also receive the HELLO packets from the peripheral terminals, i.e., the terminals residing in their own radio wave reachable ranges (of the second communication means 102), extract the addresses of the neighboring terminals from the received HELLO packets, and register the extracted addresses of the neighboring terminals in the neighboring terminal list tables 105 in a way that associates the extracted addresses with the addresses of the self-terminals. Note that the respective terminals A through F, even when receiving the HELLO packets transmitted from the neighboring terminals of the self-terminals, do not forward these packets to other terminals.

(3) Transmission of Neighboring Terminal List Announcing Packet

The neighboring terminal list announcing packet assembling unit 108 of the terminal A reads at the interval of a certain fixed period the neighboring terminal list of the self-terminal A from the neighboring terminal list table 105 (S104), and assembles the packet (containing at least the address of the self-terminal A and the addresses of the neighboring terminals B and C to the self-terminal A) in which the readout list is registered in its payload. The terminal A transmits at the first speed the thus-assembled packet (which will hereinafter be referred to as a neighboring terminal list announcing packet) to the peripheral terminals, i.e., other terminals embraced by the multi-hop wireless communication network via the base station 200 by use of the first communication means 101 (S105).

Simultaneously, the terminal A transmits at the second speed this neighboring terminal list announcing packet toward the peripheral terminals, i.e., the terminals residing in its own radio wave reachable range (of the second communication means 102) by use of the second communication means 102. These transmissions are indicated by arrowheads of two doted lines extending to the first transmission means 101 and the second transmission means 102 from a block of [the neighboring terminal list announcing packet of only the self-terminal].

Thus, the scheme that the neighboring terminal list announcing packet is transmitted by the second communication means 102 as well as by the first communication means 101, is a countermeasure against a possibility that the first communication means performs the communications via the base station and therefore might have a transmission delay. Accordingly, for instance, even when the terminal B is replaced with a new terminal B' in the multi-hop wireless communication network shown in FIG. 1, the terminal C is capable of receiving the neighboring terminal list announcing packet (containing an address of the new terminal B') transmitted by the second communication means 102 from the terminal A and can therefore, even if some delay occurs in the communications by the first communication means, quickly acquire the neighboring terminal list announcing packet.

The terminals B through F assemble, in the same way as the terminal A does, the neighboring terminal list announcing packets (containing at least the addresses of the self-terminals and the addresses of the neighboring terminals to the self-terminals) at the interval of the fixed period, and transmit at the first speed these assembled neighboring terminal list announcing packets toward the peripheral terminals, i.e., other terminals embraced by the multi-hop wireless communication network via the base station 200. A transmission period of the neighboring terminal list announcing packet is to be set larger than a transmission period of the HELLO packet. Along with this transmission, the terminals B through F transmit at the second speed the neighboring terminal list announcing packets toward the peripheral terminals, i.e., the terminals residing in their own radio wave reachable ranges (of the second communication means 102) by use of the second communication means 102.

(4) Receipt of Neighboring Terminal List Announcing Packet

The terminal A receives the neighboring terminal list announcing packets transmitted from all the peripheral terminals by use of the first communication means 101 (S106). In the present embodiment, the terminal A is to receive the neighboring terminal list announcing packets (containing at least an address of a source terminal and the addresses of the neighboring terminals to the source terminal) transmitted individually from the non-neighboring terminals D, E and F other than the neighboring terminal to the self-terminal which are located at comparatively long distances and from the neighboring terminals B and C to the self-terminal which are located at comparatively short distances. The terminal A, however, discards the neighboring terminal list announcing packets received from the terminals B and C without registering these packets in the neighboring terminal list table 105.

The terminal A having received the neighboring terminal list announcing packets from the non-neighboring terminals that are not neighboring to the self-terminal, extracts the addresses of the neighboring terminals to the none-neighboring terminals from the received neighboring terminal lists. For example, the terminal A, when receiving the neighboring terminal list announcing packet (containing at least the address of the non-neighboring terminal D and the addresses of the neighboring terminals B and F to the non-neighboring terminal D) from the non-neighboring terminal D, extracts the address of the non-neighboring terminal D and the addresses of the neighboring terminals B and F to the non-neighboring terminal D out of the received neighboring terminal list announcing packet. The terminal A registers, in the neighboring terminal list table 105, the extracted addresses of the non-neighboring terminal D and of the neighboring terminals B and F to the non-neighboring terminal D by use of the neighboring terminal list table management unit 104 (S107).

Specifically, the address of the non-neighboring terminal D is registered in the core terminal address 105a, and the addresses of the neighboring terminals B and F to the non-neighboring terminal D are registered in the neighboring terminal address 105b. Further, the address of the terminal D is additionally registered in the neighboring terminal address 105b associated with the terminal B entered in (the field of) the core terminal address 105a. This process is the same with a case of receiving the neighboring terminal list announcing packets from the non-neighboring terminals E and F that are not neighboring to the self-terminal A. It should be noted that the respective terminals A through F, even when receiving the neighboring terminal list announcing packets, do not forward these packets to other terminals.

(5) Creation/Updating of Routing Table

When data in the neighboring terminal list table 105 are registered or updated, the neighboring terminal list table management unit 104 notifies the route calculation unit 106 of the table updating each time (S108). The route calculation unit 106, upon receiving this notification, reads all the elements (data) from the neighboring terminal list table 105, then recognizes which terminal the packet can reach from the self-terminal A in the multi-hop wireless communication network, and calculates the shortest route to each packet-reachable terminal from the self-terminal A by use of Dijkstra algorithm. Namely, the route calculation unit 106 builds up routes to the terminals (other than the self-terminal) on the multi-hop wireless communication network on the basis of the addresses of the non-neighboring terminals that are not neighboring to the self-terminal A and the addresses of the neighboring terminals to the self-terminal A, these addresses being registered in the neighboring terminal list table 105. The route calculation unit 106 creates/updates the elements (data) in the routing table 107 on the basis of the built-up routes (S109).

(6) Transmission/Receipt of Data Packet

Herein, the source terminal of the data packet (into which the data excluding the route constructing data are packetized) is called an originating terminal, while the terminal as a final destination of the data packet is called a destination terminal.

When the terminal A sends, with the self-terminal A serving as the originating terminal, the data packet to the terminal F as an addressee, the terminal A determines an address of a next-relay (next-hop) terminal of the data packet. To be specific, the data packet assembling/processing unit 109 of the terminal A refers to the routing table 107 (S110) and determines the addresses of the neighboring terminals B and C to the self-terminal A (S111). The terminal A transmits the data packet at the second speed toward the neighboring terminal B or C by use of the second communication means 102 (S112). Namely, the terminal A transmits the data packet to the neighboring terminal B or C to the self-terminal A along the route built up by the route calculation unit 106 by using the second communication means 102.

For instance, when the terminal A designates the neighboring terminal B and sends the data packet thereto, the terminal B receives the data packet through the second communication means of the self-terminal B. The terminal B having received the data packet, since the destination terminal of the data packet is the terminal F, determines an address of a further next-hop terminal of the data packet by referring to the routing table 107 of the self-terminal B. Herein, the address of the neighboring terminal D to the self-terminal B is determined as the address of the next-hop terminal. The terminal B transmits the data packet toward the address-determined neighboring terminal D by the second communication means 102 of the self-terminal B.

The terminal D receives the data packet by the second communication means 102 of the self-terminal D. The terminal D, since the destination terminal of the data packet is the terminal F, similarly determines an address of a further next-hop terminal of the data packet by referring to the routing table 107 of the self-terminal D. Herein, the address of the neighboring terminal F to the self-terminal D is determined as the address of the next-hop terminal. The terminal D transmits the data packet toward the address-determined neighboring terminal F by the second communication means 102 of the self-terminal D.

The terminal F receives the data packet by the second communication means 102 of the self-terminal F. The terminal F, as the destination terminal of the data packet is the terminal F, captures the data packet into the self-terminal F without further forwarding the data packet. Thus, the data packet originating from the terminal A reaches the terminal F finally.

As discussed above, according to the wireless communication system having the architecture given above, in the multi-hop wireless communication network embracing the plurality of terminals, even when there increase the number of the terminals increases and the control packets (transmitted and received by the first communication means 101 in the present embodiment) that should be transmitted to and received from each other, it follows that a throughput of the data packets (transmitted and received by the second communication means 102 in the present embodiment) is not restricted.

Figure 6:
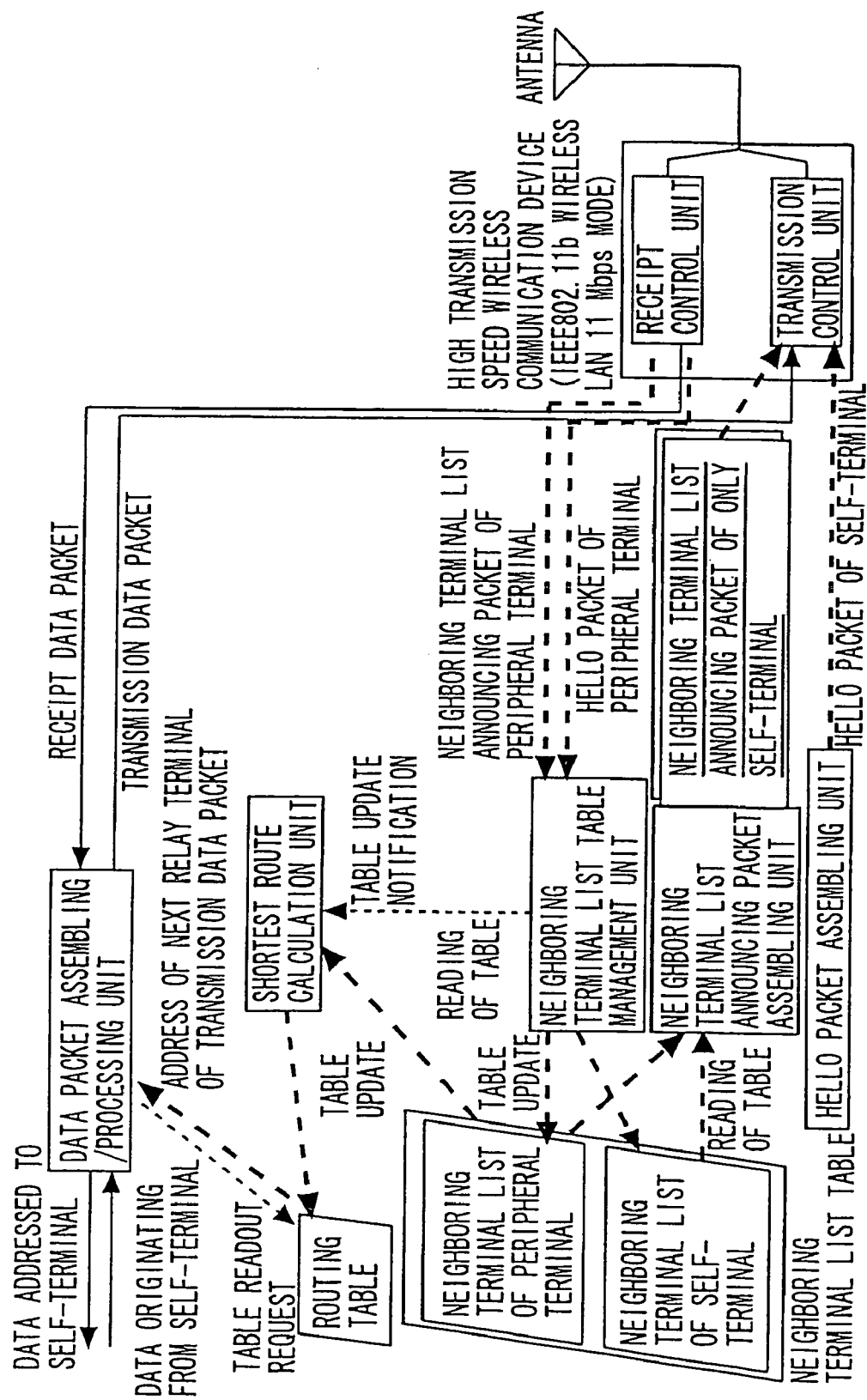
FIG. 6 is an explanatory diagram of an outline of a system architecture of a conventional wireless communication system.

Herein, features of the wireless communication system having the architecture described above will be explained in greater detail with reference to FIG. 6. FIG. 6 is an explanatory diagram of an outline of a system architecture of a conventional wireless communication system.

A premise in the conventional system is that each terminal has only one wireless device. FIG. 6 is the diagram of the whole architecture in contrast with FIG. 1.

A largest difference between the prior art and the wireless communication system according to the present embodiment, lies in an operation when transmitting the neighboring terminal list announcing packet. According to the prior art, not only the neighboring terminal list of the self-terminal but also the hitherto-received neighboring terminal lists of other terminals must be contained. On the other hand, in the wireless communication system according to the present embodiment, it is sufficient that only the neighboring terminal list of the self-terminal is described.

This is because the conventional system actualizes announcing of the neighboring terminal list in a neighboring terminal list announcing process in such a way that the terminal receiving the content of the control packet transmitted by a certain terminal further forwards the packet to other terminals, and, by contrast, the wireless communication system in the present embodiment actualizes announcing by transmitting the neighboring terminal list announcing packet by use of the low-speed wireless devices communicable with each other and delivering the packet directly to all the terminals.

Namely, the wireless communication system in the present embodiment has no necessity of forwarding the information of the neighboring terminals excluding the self-terminal to other terminals. This scheme enables the data size of the neighboring terminal list announcing list to be reduced as compared with the conventional system. Through the operation described above, the wireless communication system according to the present embodiment can reduce the throughput in relation to the transmission of the control packets. Further, the delay time caused by announcing of the control information is shorter than in the conventional system, and hence, even if high of the moving speed of the terminal and large of changes in the communication links between the terminals, accuracy with which each terminal recognizes the shortest route is improved.

Figure 5:
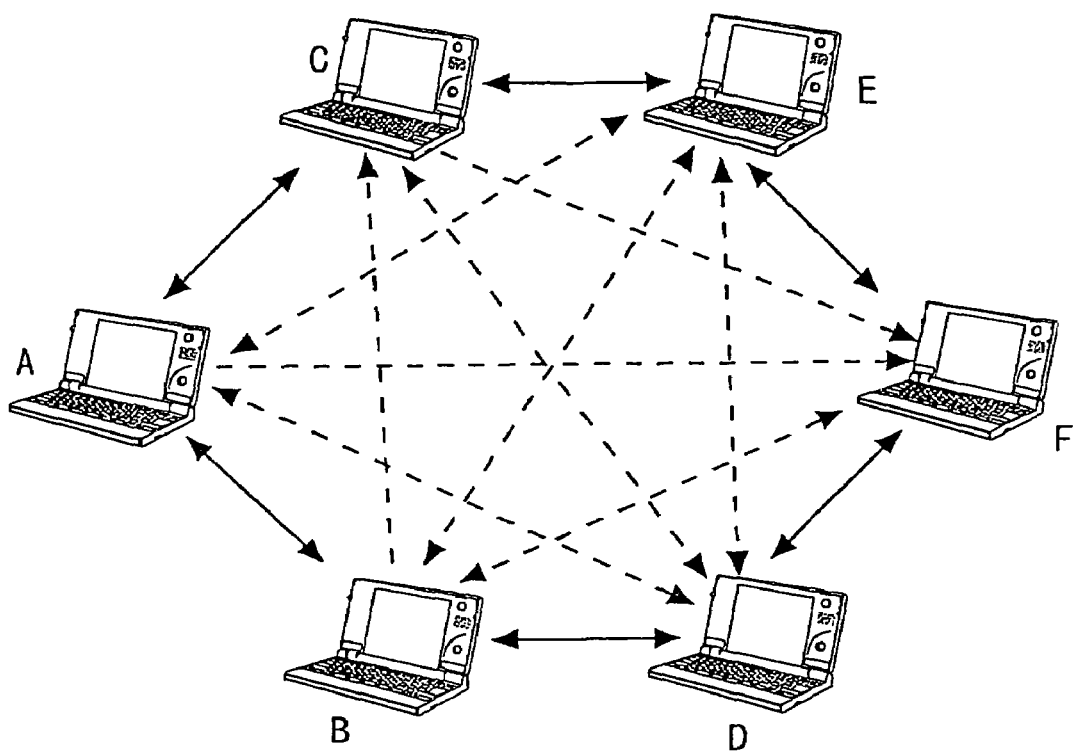
FIG. 5 is an explanatory diagram of an outline of a system architecture of a modified example of the wireless communication system in the embodiment of the present invention.

Next, a modified example of the wireless communication system will be explained with reference to FIG. 5. FIG. 5 is an explanatory view of an outline of a system architecture of a modified example of the wireless communication system.

A different point of the wireless communication system in this modified example from the embodiment discussed above is that a communication means capable of directly transmitting and receiving at the first speed the neighboring terminal information to and from at least the non-neighboring terminals other than the neighboring terminals to the self-terminal with no intermediary of the base station 200, is employed as the first communication means 101. Other configurations are the same as those in the wireless communication system described above. This type of first communication means 101 can involve using the low-speed wireless LAN device defined by, e.g., IEEE802.11b Wireless LAN 1 Mbps MODE and so on.

Note that the two terminals (e.g., the terminal A and the terminal D) connected to each other as indicated by two arrowheads of dotted-lines, are shown as a terminal pair incapable of directly communicating with each other by the second communication means 102 but capable of communicating with each other by the first communication means 101 in FIG. 5. A distance between the terminals in this case is on the order of, e.g., 150 m to 500 m outdoors. Further, the two terminals (e.g., the terminal A and the terminal B) connected to each other as indicated by two arrowheads of solid lines, are shown as a terminal pair capable of directly communicating with each other by the second communication means 102. A distance between the terminals in this case is on the order of, e.g., 150 m outdoors.

Moreover, the embodiment discussed above has exemplified the configuration, wherein each of the first communication means 101 and the second communication means 102 is constructed of the single communication device (the low-speed communication device such as the PHS phone, etc., and the high-speed LAN device). The present invention is not, however, limited to this configuration. For example, a single communication device including the first communication means 101 and the second communication means 102 can also be employed. In this case, this single communication device performs the communications in a way that switches over the communications (between the self-terminal and the non-neighboring terminals that are not neighboring to the self-terminal) by the first communication means and the communications (between the self-terminal and the neighboring terminals to the self-terminal) by the second communication means.

What can be considered as a switchover timing is that a switchover signal is issued before the packets are transmitted respectively from, e.g., the HELLO packet assembling unit 103, the neighboring terminal list announcing packet assembling unit 108 and the data packet assembling/processing unit 109, and the single communication device receiving this switchover signal switches over the communications by the first communication means and the communications by the second communication means. This contrivance enables the wireless communication device to be manufactured at a lower cost than in the case of constructing each of the first and second communication means as the single communication device.

Further, the embodiment discussed above has exemplified the case in which the terminal is the mobile information terminal such as the notebook type personal computer and the PDA, however, there may also be, as a matter of course, available a case where this terminal is mounted on a moving body such as a vehicle, a motorcycle, etc. and thus becomes mobile.

Moreover, the embodiment discussed above has exemplified the scheme that the neighboring terminal list announcing packet is transmitted by both of the first communication means 101 and the second communication means 102. The present invention is not, however, limited to this scheme. For instance, if the transmission delay does not matter, the neighboring terminal list announcing packet may also be transmitted only by the first communication means 101. In this case, there is no necessity for the arrowheads of two doted lines extending to the second transmission means 102 from the block of [the neighboring terminal list announcing packet of only the self-terminal] in FIG. 2.

The present invention can be carried out in other various forms without departing from the spirit and the principal features of the invention. Therefore, the embodiment discussed above is nothing but the simple exemplification in every aspect, and the present invention is not limitedly construed by the description of the embodiment.

INDUSTRIAL APPLICABILITY

According to the present invention, in the multi-hop wireless communication network embracing the plurality of terminals, even when there increase the number of the terminals (the relay terminals) and the control packets (the neighboring terminal information) that should be transmitted to and received from each other, the throughput of the data packet (the information other than the neighboring terminal information) is not restricted.

What is claimed is:

1. A wireless communication device for performing wireless communications between a plurality of terminals embraced by a multi-hop wireless communication network, comprising:

first communication means for transmitting and receiving neighboring terminal information at a first speed to and from non-neighboring terminals other than neighboring terminals of a self-terminal; and second communication means for transmitting and receiving information other than at least the neighboring terminal information at a second speed higher than the first speed to and from the neighboring terminals to the self-terminal, wherein said first communication means receives data containing network addresses of neighboring terminals neighboring to the non-neighboring terminals from the non-neighboring terminals that are not neighboring to the self-terminal, and transmits data containing network addresses of the neighboring terminals neighboring to the self-terminal to the non-neighboring terminals that are not neighboring to the self-terminal.

2. A wireless communication device according to claim 1, wherein said second communication means receives the data containing the network addresses of the neighboring terminals from the neighboring terminals neighboring to the self-terminal, and transmits the data containing a network address of the self-terminal to the neighboring terminals neighboring to the self-terminal.

3. A wireless communication device according to claim 1, further comprising:
  route constructing means for structuring routes on the multi-hop wireless communication network on the basis of route constructing data containing the network addresses of the neighboring terminals neighboring to the non-neighboring terminal which are received by said first communication means and the network addresses of the neighboring terminals which are received by said second communication means,
  wherein said second communication means transmits data other than the route constructing data to the neighboring terminals neighboring to the self-terminal along the route structured by said route constructing means.

4. A wireless communication device according to claim 1, wherein said first communication means transmits and receives the neighboring terminal information to and from the non-neighboring terminals that are not neighboring to the self-terminal via the base station.

5. A wireless communication device according to claim 1, wherein each of said first communication means and said second communication means is constructed as a single communication device.

6. A wireless communication device according to claim 1, further comprising a single communication device including said first communication means and said second communication means,
  wherein said communication device performs the communications in a way that switches over the communications by said first communication means and the communications by said second communication means.

7. A wireless communication system for performing wireless communications between a plurality of terminals embraced by a multi-hop wireless communication network, each of said terminals comprising:
  first communication means for transmitting and receiving neighboring terminal information at a first speed to and from non-neighboring terminals other than neighboring terminals neighboring to a self-terminal; and
  second communication means for transmitting and receiving information other than at least the neighboring terminal information at a second speed higher than the first speed to and from the neighboring terminals neighboring to the self-terminal,
  wherein said first communication means receives data containing network addresses of neighboring terminals neighboring to the non-neighboring terminals from the non-neighboring terminals that are not neighboring to the self-terminal, and transmits data containing network addresses of the neighboring terminals neighboring to the self-terminal to the non-neighboring terminals that are not neighboring to the self-terminal.

8. A wireless communication method of performing wireless communications between a plurality of terminals embraced by a multi-hop wireless communication network, comprising:
  for each of the terminals transmitting and receiving neighboring terminal information at a first speed to and from non-neighboring terminals other than neighboring terminals neighboring to a self-terminal, and
  for each of the terminals transmits and receives transmitting and receiving information other than at least the neighboring terminal information at a second speed higher than the first speed to and from the neighboring terminals neighboring to the self-terminal, the method further comprising
  receiving at each terminal data containing network addresses of neighboring terminals neighboring to the non-neighboring terminals from the non-neighboring terminals that are not neighboring to the self-terminal, and transmitting from each terminal data containing network addresses of the neighboring terminals neighboring to the self-terminal to the non-neighboring terminals that are not neighboring to the self-terminal.

9. A vehicle mounted with a wireless communication device for performing wireless communications between a plurality of terminals embraced by a multi-hop wireless communication network, said wireless communication device comprising:
  first communication means for transmitting and receiving neighboring terminal information at a first speed to and from non-neighboring terminals other than neighboring terminals neighboring to a self-terminal; and
  second communication means for transmitting and receiving information other than at least the neighboring terminal information at a second speed higher than the first speed to and from the neighboring terminals neighboring to the self-terminal,
  wherein said first communication means receives data containing network addresses of neighboring terminals neighboring to the non-neighboring terminals from the non-neighboring terminals that are not neighboring to the self-terminal, and transmits data containing network addresses of the neighboring terminals neighboring to the self-terminal to the non-neighboring terminals that are not neighboring to the self-terminal.

10. A wireless communication terminal embraced by a multi-hop wireless communication network, comprising:
  first wireless communication means for performing communications with other terminals embraced by the multi-hop wireless communication network with no intermediary of the multi-hop wireless communication network; and
  second wireless communication means for performing communications with neighboring terminals neighboring to a self-terminal which reside in its own radio wave reachable range among other terminals embraced by the multi-hop wireless communication network,
  wherein said first wireless communication means transmits and receives information of the neighboring terminals to and from other terminals, and
  said second wireless communication means transmits and receives information excluding at least the neighboring terminal information to and from the neighboring terminals neighboring to the self-terminal,
  wherein said first wireless communication means receives data containing network addresses of other terminals and network addresses of neighboring terminals neighboring to other terminals from other terminals, and transmits data containing a network address of the self-terminal and the network addresses of the neighboring terminals neighboring to the self-terminal to other terminals.

11. A wireless communication terminal according to claim 10, wherein a communication speed of said second wireless communication means is higher than a communication speed of said first wireless communication means.

12. A wireless communication terminal according to claim 10, wherein said second wireless communication means receives data containing network addresses of neighboring terminals neighboring to the self-terminal from the neighboring terminal, and transmits data containing a network address of the self-terminal to the neighboring terminals neighboring to the self-terminal.

13. A wireless communication terminal according to claim 10, wherein the information of the neighboring terminals is route constructing data for structuring routes on the multi-hop wireless network.

14. A wireless communication terminal according to claim 13, wherein the route constructing data contain the network addresses of the neighboring terminals neighboring to other terminals, which are received by at least said first wireless communication means.

15. A wireless communication terminal according to claim 13, further comprising route constructing means for structuring routes on the multi-hop wireless communication network on the basis of the route constructing data.

16. A wireless communication terminal according to claim 15, wherein said second wireless communication means transmits data other than the route constructing data along the routes structured by said route constructing means to the neighboring terminals neighboring to the self-terminal.

17. A wireless communication terminal according to claim 10, wherein said first wireless communication means transmits and receives the information of the neighboring terminal to and from other terminals via the base station.

18. A wireless communication terminal according to claim 17, wherein said second wireless communication means further transmits and receives the information of the neighboring terminal to and from the neighboring terminals neighboring to the self-terminal.

19. A wireless communication terminal according to claim 11, wherein each of said first wireless communication means and said second wireless communication means is constructed as a single communication device.

20. A wireless communication terminal according to claim 11, further comprising a single communication device including said first wireless communication means and said second wireless communication means,
wherein said communication device performs the communications in a way that switches over the communications by said first wireless communication means and the communications by said second wireless communication means.

21. A wireless communication system configured by a plurality of terminals embraced by a multi-hop wireless communication network,
each of said terminals comprising:
first wireless communication means for performing communications with other terminals embraced by the multi-hop wireless communication network with no intermediary of the multi-hop wireless communication network; and second wireless communication means for performing communications with neighboring terminals neighboring to a self-terminal which reside in its own radio wave reachable range among other terminals embraced by the multi-hop wireless communication network,
wherein said first wireless communication means transmits and receives information of the neighboring terminals to and from other terminals, and
said second wireless communication means transmits and receives information excluding at least the neighboring terminal information to and from the neighboring terminals neighboring to the self-terminal,
wherein said first wireless communication means receives data containing network addresses of other terminals and network addresses of neighboring terminals neighboring to other terminals from other terminals, and transmits data containing a network address of the self-terminal and the network addresses of the neighboring terminals neighboring to the self-terminal to other terminals.

22. A wireless communication method of performing wireless communications between a wireless communication terminal embraced by a multi-hop wireless communication network and other terminals, said method comprising:
wirelessly communicating with other terminals embraced by the multi-hop wireless communication network with no intermediary of the multi-hop wireless communication network using a first communication system; and
wirelessly communicating with neighboring terminals neighboring to a self-terminal which resides in its own radio wave reachable range among other terminals embraced by the multi-hop wireless communication network using a second communication system,
the wireless communication terminal transmitting and receiving information of the neighboring terminals to and from other terminals by use of said first wireless communication system, and
the wireless communication terminal transmitting and receiving information excluding at least the neighboring terminal information to and from the neighboring terminals neighboring to the self-terminal by use of said second wireless communication system,
said first wireless communication system receiving data containing network addresses of other terminals and network addresses of neighboring terminals neighboring to other terminals from other terminals, and transmitting data containing a network address of the self-terminal and the network addresses of the neighboring terminals neighboring to the self-terminal to other terminals.

23. A vehicle mounted with a wireless communication terminal embraced by a multi-hop wireless communication network, said wireless communication terminal comprising:
first wireless communication means for performing communications with other terminals embraced by the multi-hop wireless communication network with no intermediary of the multi-hop wireless communication network; and
second wireless communication means for performing communications with neighboring terminals neighboring to a self-terminal which reside in its own radio wave reachable range among other terminals embraced by the multi-hop wireless communication network,
wherein said first wireless communication means transmits and receives information of the neighboring terminals to and from other terminals, and said second wireless communication means transmits and receives information excluding at least the neighboring terminal information to and from the neighboring terminals neighboring to the self-terminal,
wherein said first wireless communication means receives data containing network addresses of other terminals and network addresses of neighboring terminals neighboring to other terminals from other terminals, and transmits data containing a network address of the self-terminal and the network addresses of the neighboring terminals neighboring to the self-terminal to other terminals.

* * * * *